United States Patent [19]

Logsdon

[11] 3,911,958
[45] Oct. 14, 1975

[54] LOW NOISE LEVEL AIR FLOW CONTROL UNIT

[75] Inventor: Hillard Glenn Logsdon, Charlotte, N.C.

[73] Assignee: Aeronca, Inc., Pineville, N.C.

[22] Filed: Feb. 1, 1974

[21] Appl. No.: 438,573

[52] U.S. Cl. .......... 137/798; 137/512.15; 137/512.5; 137/517; 137/625.12; 138/46; 251/DIG. 2; 251/143
[51] Int. Cl.² ........................................ G05D 16/06
[58] Field of Search ........ 98/38 R, 41 R; 137/512.1, 137/512.15, 512.5, 517, 518, 521, 525.5, 625.12, 798; 138/46; 251/DIG. 2, 143

[56] References Cited
UNITED STATES PATENTS

| | | | |
|---|---|---|---|
| 2,890,716 | 6/1959 | Werder | 137/517 X |
| 3,000,395 | 9/1961 | Waterfill | 137/518 X |
| 3,053,454 | 9/1962 | Waterfill | 98/38 B X |
| 3,179,125 | 4/1965 | O'Day et al. | 137/512.1 X |
| 3,292,657 | 12/1966 | Reynolds | 137/517 X |
| 3,394,769 | 7/1968 | Smith et al. | 137/512.1 |

*Primary Examiner*—Alan Cohan
*Assistant Examiner*—Gerald A. Michalsky
*Attorney, Agent, or Firm*—Parrott, Bell, Seltzer, Park & Gibson

[57] ABSTRACT

A control unit for air distributing systems comprising a housing within which an air volume regulator is positioned and supported by a conduit means in such a manner as to dampen the vibrations produced by the flow of air through the air volume regulator to reduce the noises created thereby being transferred to the housing. The conduit means comprises a duct communicating with and extending between the air inlet of the housing and the inlet end of the air volume regulator, with one end of the duct secured to the inlet end of the air volume regulator and its other end being secured to and supported by the inlet end wall of the housing so as to support the air volume regulator out of contact with the side walls of the housing.

5 Claims, 6 Drawing Figures

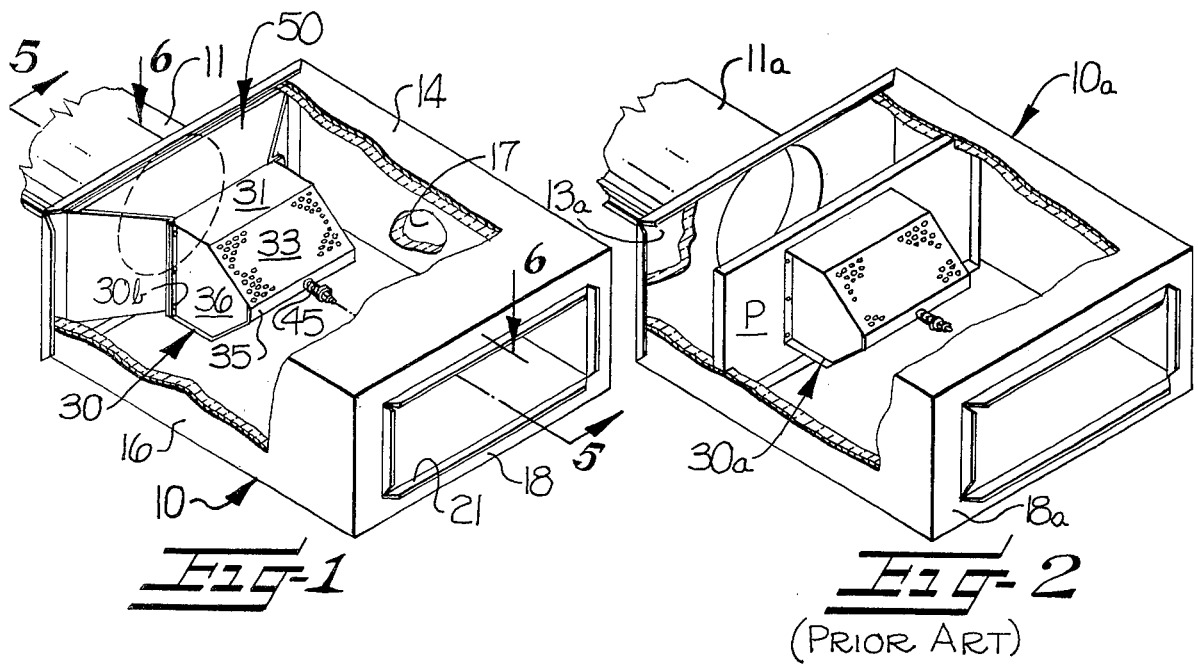
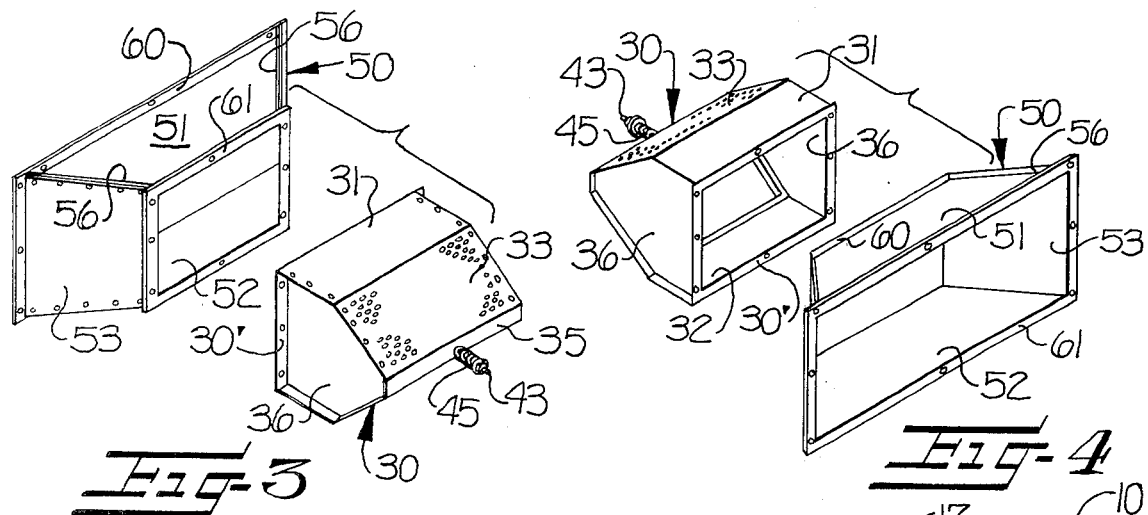
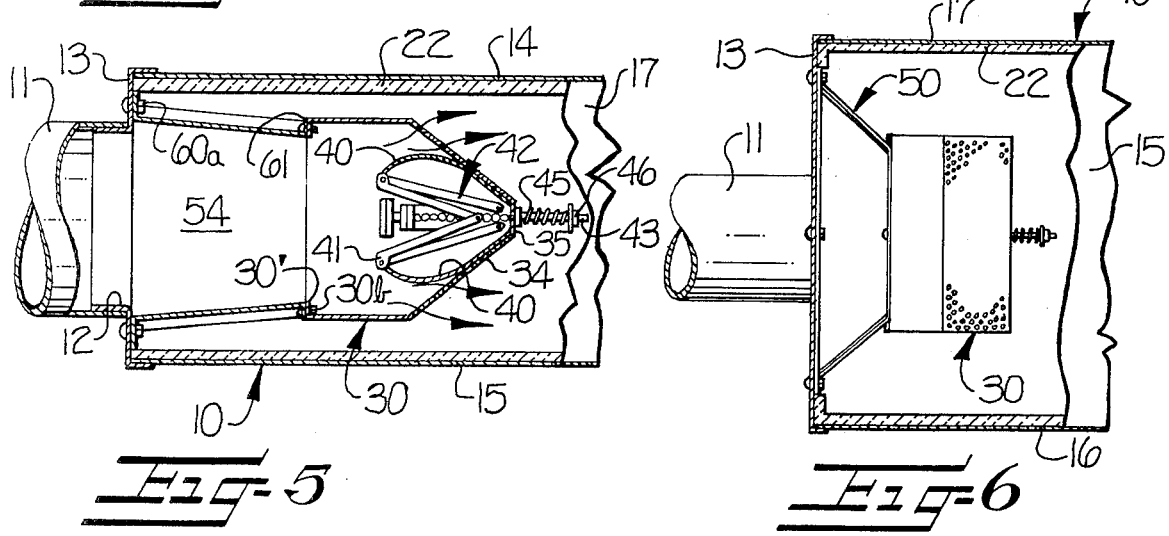

LOW NOISE LEVEL AIR FLOW CONTROL UNIT

This invention relates to an improved control unit for an air distributing system, and it is the primary object of this invention to provide an air flow control unit having a housing within which an air volume regulator is so mounted for communication with the air inlet of the housing as to dampen the vibrations produced by the flow of air through the air volume regulator to thereby reduce the noises created by the air volume regulator being transferred to the housing of the control unit.

It is well known that air volume regulators generally are supported within relatively large air distributing housings which serve as expansion chambers for directing conditioned air directly into an enclosure or room, or which direct the air into one or more outlet conduits for further distribution. In most instances, the primary function of such air volume regulators is to receive an airstream flowing at relatively high velocity and under relatively high pressure, and to direct such airstream at a substantially constant volume into the air distributing housing.

One of the more critical problems encountered in the design and manufacture of the known prior art types of air flow control units resides in the fact that known forms of constant volume regulators are subjected to considerable vibrations produced during the flow of air therethrough, and the noises created by such vibrations are transmitted to the surrounding housing of the control unit due to the manner in which the air volume regulators have been mounted and supported in the surrounding housing. Such surrounding housings usually are quite large as compared to the air volume regulator and thus have relatively large wall surfaces which, when vibrated by the vibrations being transmitted thereto from the air volume regulator, have an effect somewhat in the nature of a drum, which undesirably amplifies the noises created by the air volume regulator.

One well-known type of air volume regulator that has been mounted and supported heretofore in a surrounding housing in such a manner as to create undesirable noise problems, has been of the "flexible curtain" type. This type of air volume regulator has a housing with a perforated wall defining an air passage through which the air flows in its course into the surrounding air distributing housing. Spring-biased flexible curtain means is provided within the housing of the regulator in the path of the flowing air and and is adapted to be urged against the surface of the perforated wall by the pressure of the air impinging thereagainst so as to reduce the effective size of the air passage through the housing and thereby restrict the flow of air through the volume regulator. Normally, an intermediate wall plate with an air-flow opening therethrough is connected to the side walls of the surrounding housing and serves for supportingly mounting the air volume regulator in the surrounding housing. Experience and tests have shown that this type of mounting has resulted in an undesirable high level of noise from the operation of the air volume regulators.

It is, therefore, a more specific object of this invention to provide an improved control unit for an air distributing system wherein conduit means supports an air volume regulator within a surrounding air distributing housing so as to dampen the vibrations produced by the flow of air therethrough and wherein the conduit means is in the form of a duct having one end secured to the inlet end of the air volume regulator and having its other end secured to and supported by the air ingress end wall of the surrounding housing so as to support the air volume regulator out of contact with the side walls of the surrounding housing.

It is still another object of this invention to provide a control unit of the character described wherein the supporting duct for the air volume regulator is composed of side walls convergingly arranged toward the air volume regulator and which define an expansion chamber for the airstream emerging from the inlet in the end wall of the surrounding housing.

Some of the objects of the invention having been stated, other objects will appear as the description proceeds when taken in connection with the accompanying drawings, in which:

FIG. 1 is a perspective view of the improved control unit in association with an air inlet conduit of an air distributing system, with portions of the control unit main housing broken away to show the improved conduit means for supporting the air volume regulator in accordance with this invention;

FIG. 2 is a perspective view similar to FIG. 1, but showing a typical mounting arrangement as used in the prior art for supporting an air volume regulator in a surrounding housing;

FIG. 3 is a partially exploded view of the air volume regulator and the supporting duct of the present invention, but showing the same removed from the air distributing housing of FIG. 1;

FIG. 4 is a view similar to FIG. 3, but looking at the opposite end of the duct and the air volume regulator from that shown in FIG. 3;

FIG. 5 is an enlarged fragmentary vertical sectional view taken substantially along line 5—5 in FIG. 1; and FIG. 6 is a fragmentary plan view, partially in section, taken substantially along line 6—6 in FIG. 1.

Referring more specifically to the drawing, the improved control unit is shown in an assembled state in FIGS. 1, 5 and 6 and is of a type comprising a relatively large, substantially rectangular air distributor housing or main housing broadly designated at 10. In normal use, main housing 10 is adapted to normally occupy a substantially horizontal position installed with an air distributing system represented by an air inlet conduit 11. Conduit 11 directs an airstream of conditioned air at relatively high velocity and relatively high pressure through an inlet or opening 12 provided in the rear or upstream end wall 13 of main housing 10. Inlet 12 is relatively small relative to the size of end wall 13, as is usual.

As shown, housing 10 may be constructed of sheet metal or other relatively thin material and, in addition to the rear end wall 13, main housing 10 comprises opposing pairs of side walls 14, 15 and 16, 17 and a front or egress end wall 18. In this instance, walls 14, 15 are shown as being the respective top and bottom walls of housing 10.

The various side walls 14–17 and front end wall 18 may be provided with any desired number of air outlet openings therein, or if desired, a single outlet opening may be provided in any one or more of the walls 14–18. By way of example, the front end wall 18 is provided with a substantially rectangular air outlet or opening 21 (FIG. 1) therethrough which may communicate directly with an enclosure or room to be air conditioned or to which other outlet conduits may be communicatively connected, as is well known. As is conventional, the inner surfaces of the relatively thin walls 13–18 of housing 10 may be provided with a layer or sheets of suitable thermal insulation and/or sound absorbing material 22 thereon.

To insure that only a predetermined, preferably constant, volume of air is permitted to enter main housing 10 through conduit 11 and inlet 12, an air volume regulator 30 is stationarily mounted within and thus surrounded by main housing 10. As shown in FIGS. 1, 5 and 6, air volume regulator 30 is of substantially smaller external dimensions than the internal dimensions of housing 10. Volume regulator 30 may take various forms, but is preferably of the type illustrated, which is a form of constant volume regulator comprising a regulator housing formed of any suitable sheet material, such as aluminum or steel. The housing of volume regulator 30 comprises opposed, substantially parallel, generally rectangular side walls or upper and lower walls 31, 32 extending from the open rear or inlet end of volume regulator 30 and forwardly for a relatively short distance. Inclined, forwardly converging, perforate side walls 33, 34 extend from the forward edge portions of walls 31, 32, with the front edge portions of the converging side walls 33, 34 being connected to a relatively narrow, elongate front end wall 35. The converging walls 33, 34 are perforated so that the airstream from inlet conduit 11 may flow through the perforate walls 33, 34 and into the surrounding main housing 10, where the airstream then expands and is further distributed, as is well known. Opposite sides of regulator 30 are closed by respective side walls 36.

As shown in FIG. 5, a pair of curtain means 40 of flexible imperforate material are attached within regulator 30 to the inner surface of the front end wall 35 thereof. Curtain means 40 extend rearwardly from wall 35 a sufficient distance to cover the respective perforate, forwardly converging walls 33, 34. The rear ends of the pair of curtain means 40 are fixed to a pair of parallel rod means 41. Rod means 41 are connected, by suitable linkage generally designated at 42, to a centrally located longitudinally reciprocable shaft 43 within volume regulator 30 and loosely penetrating front end wall 35.

Suitable compression spring means 45 is provided surrounding the outer exposed end portion of shaft 43, and a lock nut 46 is threaded on the outer end of shaft 43 for serving as an adjustable abutment for spring means 45. Spring means 45 thus biases shaft 43 forwardly and, through linkage 42, biases the pair of curtain means 40 toward each other and away from walls 33, 34 to an open position. As is well known, curtain means 40 form a variable orifice means which is effective to regulate the flow of the airstream through the volume regulator housing and flowing through converging walls 33, 34 into the surrounding housing 10.

For more detailed disclosures of air volume regulators of the type described herein, reference is made to Werder U.S. Pat. No. 2,890,716, issued June 16, 1959; Waterfill U.S. Pat. No. 3,000,395, issued Sept. 19, 1961; Waterfill U.S. Pat. No. 3,060,960, issued Oct. 30, 1962; Smith U.S. Pat. No. 3,394,769, issued July 30, 1968; and Smith U.S. Pat. No. 3,425,443, issued Feb. 4, 1969. The aforementioned patents are directed to various aspects of air volume regulators of the type heretofore described, and accordingly, a further more detailed description thereof is deemed unnecessary.

As indicated earlier herein, the relatively high velocity and pressure of the air flowing through volume regulator 30 impart considerable vibrations to the walls of air volume regulator 30 and, in the known prior art types of control units, the noises created by the vibrations of the air volume regulators have been transmitted to the surrounding main housings therefor and, especially, to the adjacent relatively large surfaces of the walls of the corresponding housings, because the air volume regulators of the prior art have been mainly supported by the adjacent side walls of the surrounding housings within which they were positioned as indicated in the prior art illustration of FIG. 2.

In this regard, it will be observed in FIG. 2 that a main housing 10a is illustrated which is substantially the same as the housing 10 providing the environmental setting for the present invention. Accordingly, a detailed description of housing 10a will not be given. It will be noted that an inlet conduit 11a is connected to the rear end wall 13a of the prior art main housing 10a in FIG. 2. The regulator in FIG. 2 also is indicated at 30a and may be the same as the regulator 30 heretofore described with respect to the present invention. Accordingly, a detailed description of the regulator 30a in FIG. 2 will not be given, but it will be noted that the rear open end of air volume regulator 30a is secured to a transverse partition or intermediate wall plate P which, of course, is provided with a suitable air-flow opening in its central portion to communiciate with the open rear end of regulator 30a.

Partition P is spaced a substantial distance forwardly of the rear end wall 13a of the prior art housing 10a so as to provide an adequate space between partition P and wall 13a to serve as an expansion chamber for the relatively high velocity, high pressure airstream entering housing 10a and to thereby aid in the operation of the air volume regulator 30a in controlling the volume of the airstream being discharged into the forward or outlet portion of the prior art housing 10a, as is conventional. Since the partition P is spaced a substantial distance forwardly of rear wall 13a and also is spaced a substantial distance rearwardly of the front end wall 18a of the prior art housing 10a, it follows that the flanged peripheral edge portions of partition P are necessarily secured to medial portions of the opposing pairs of side walls of housing 10a thus providing a connection which transmits the noises created by the vibrations of the air volume regulator 30a to the adjacent walls of the prior art housing 10a. Consequently, the side walls of the prior art housing 10a also are caused to vibrate to a substantial degree and to thereby function somewhat in the manner of the head of a drum to thereby amplify and further aggravate the noises created by the vibrations of the air volume regulator 30a.

According to the present invention, however, the air flow control unit of FIGS. 1 and 3–6 is provided with means for substantially reducing the transfer of vibrations and noises from the air volume regulator to the opposing pairs of side walls of main housing 10 while still providing an air expansion chamber within the main housing between the air inlet conduit and the air inlet end of the air volume regulator surrounded by housing 10. To this end, an improved conduit means is provided for supporting air volume regulator 30 so as to dampen the vibrations produced by the flow of air therethrough to reduce the noises created by the air volume regulator being transferred to housing 10. As shown, the conduit means comprises a duct broadly designated at 50, which communicates with and extends between air inlet 12 and the inlet end of air volume regulator 30. As will be later described more in detail, duct 50 has one end thereof secured to the inlet end of air volume regulator 30, and the other end of duct 50 is secured to and supported by the rear end wall 13 of housing 10 so as to support air volume regulator 30 out of contact with the side walls 14–17 of housing 10.

In order to define an expansion chamber for the airstream emerging from air inlet 12 in the rear end wall 13 of housing 10, duct 50 is of substantially frustopyramidal configuration and is provided with opposing pairs of walls 51, 52; 53, 54 formed of a suitable sheet material and which are preferably formed of sheet metal of the same type of material as that forming the various walls of air volume regulator 30. Usually, such walls are made from sheet aluminum or stainless steel.

As heretofore indicated, air volume regulator 30 is of substantially smaller external dimensions than the internal dimensions of main housing 10. Therefore, in order to support air volume regulator 30 in a cantilever manner while providing an adequate expansion chamber within the rear portion of main housing 10 but communicating only with inlet 12, the inlet end of conduit 11 and the inlet end of air volume regulator 30, the open rear end of duct 50 preferably is as large as is convenient, without the side walls 51–54 thereof contacting side walls 14–17 of housing 10. Also, the side walls 51–54 of duct 50 are convergingly arranged toward air volume regulator 30 to define therein the expansion chamber for the air stream emerging from inlet 12 in main housing end wall 13.

Suitable flanges 56 project outwardly and substantially normal to the major portions of the surfaces of the opposing pair of frusto-triangular side walls; i.e., upper and lower side walls 51, 52, to facilitate the securing of the other opposing pair of side walls 53, 54 to the edge portions of the opposing frusto-triangular side walls 51, 52. Also, to facilitate securing the rear edges of the walls of duct 50 to the inner or front surface of rear end wall 13, and also to facilitate the securement of the front ends of the side walls of duct 50 to the rear end of regulator 30, the rear and front ends of duct 50 are suitably flanged about the perimeter of duct 50 with the flanges being respectively designated at 60, 61. All of the flanges 60, 61 extend outwardly with respect to the inner portion of duct 50 and substantially normal to the respective side walls 51–54 thereof. The rear perimetrical portion of the housing of air volume regulator 30 also is suitably flanged, as at 30', for securement of air volume regulator 30 to the front end flanges 61 of duct 50, as by means of bolts 30b. The flanges 60 on the rear end of duct 50 are secured to rear end wall 13 as by suitable bolts 60a.

From the foregoing description, it is apparent that the rear end of duct 50 is positioned out of contact with the opposing pairs of side walls 14, 15; 16, 17 of main housing 10 and duct 50 is cantilever-mounted on the inner surface of the rear wall 13 of the surrounding housing 10. It can be appreciated that air volume regulator 30 also is positioned out of contact with housing 10 and is cantilever-mounted on the front end of duct 50. Suitable air seals or resilient gaskets, not shown, may be provided between the rear end flanges 60 of duct 50 and the wall 13 of housing 10, as well as between the flanges 61 on the front end of duct 50 and the flanges 30' on the rear end of air volume regulator 30, if desired.

By providing the duct 50 between the rear end wall 13 of main housing 10 and the rear end of air volume regulator 30, the vibrations imparted to the air volume regulator 30 by the flow of air therethrough and the action of the curtain means 40 are transmitted to, but absorbed and dampened to a substantial degree by, the duct 50. Such vibrations are even further reduced and dampened by the flanged ends 60, 61 of the duct 50, such flanged ends serving to interrupt the flow of vibrations from volume regulator 30 to housing 10. Thus, minimal vibrations are transmitted from the housing of air volume regulator 30 to the walls of main housing 10. Actual test have determined that duct 50 has reduced previous noise levels of about 65 decibels to about 54–56 decibels; a reduction of 9–11 decibels. In view of a reduction of each three decibels reducing sound power by about 50 percent, it can be appreciated that the noise levels have been significantly reduced by this invention.

Actual tests also have indicated that it is desirable to utilize a duct 50 which is at least about 6 inches long in the direction of flow of the air therethrough, although it is apparent that the length of the duct may be longer and the optimum length thereof may be varied in accordance with the type and thickness of the material forming the walls of duct 50. Very favorable results have been obtained in actual tests by forming the walls 51–54 of duct 50 somewhat thicker than, but otherwise of the same type material as, the walls of the conventional air volume regulator 30. By way of example, an actual control unit fabricated in accordance with the present invention was provided with an air volume regulator 30 having walls which were approximately 0.040 inch thick, with the walls 51–54 of duct 50 being approximately 0.063 inch thick. It is apparent that such walls may be of other thicknesses, however, without departing from the invention.

In any event, it is apparent that, from an economical standpoint, the walls of duct 50 preferably are made from sheet aluminum or sheet steel and thus should be as thin as possible while being of the desired strength and capable of properly supporting air volume regulator 30 and to substantially absorb and dampen the vibrations being produced by the air volume regulator 30 by the high velocity, high pressure air flowing therethrough. As indicated above, it is preferred that the side walls of duct 50 are of a heavier gauge thickness than the side walls of air volume regulator 30, and that the duct 50 should be at least about six inches long to provide a highly effective dampening effect upon the vibrations produced by the flow of air through air volume regulator 30.

In the drawings and specification there has been set forth a preferred embodiment of the invention, and although specific terms are employed, they are used in a generic and descriptive sense only and not for purposes of limitation.

That which is claimed is:

1. A control unit for an air distributing system comprising a main housing having opposing pairs of side walls and an end wall, said end wall having an air inlet adapted for the flow of an airstream therethrough, an air volume regulator within said housing and comprising a regulator housing having an inlet end and being of substantially smaller external dimensions than the internal dimensions of said main housing, conduit means supporting said air volume regulator so as to dampen the vibrations produced by the flow of air therethrough to reduce the noises created by the air volume regulator being transferred to said main housing, said conduit means comprising a duct having a minimum length in the direction of flow of the airstream therethrough of about six inches and having flanged opposite ends, said duct communicating with and extending between said air inlet and the inlet end of said air volume regulator and being positioned out of contact with the side walls of said main housing, and said duct having one flanged end secured to the inlet end of said regulator housing and having its other flanged end secured to and supported by said end wall of said main housing so as to support said air volume regulator out of contact with the side walls of the main housing, said flanged ends of said duct facilitating connecting the ends of the duct to said air volume regulator and said main housing end wall and also serving to interrupt the flow of vibrations from the volume regulator to the main housing.

2. Apparatus according to claim 1, wherein said duct is composed of side walls convergingly arranged toward said air volume regulator and defining an expansion chamber for the airstream emerging from said inlet in said housing end wall.

3. Apparatus according to claim 1, wherein said duct is of substantially frusto-pyramidal configuration.

4. A control unit for an air distributing system comprising a main housing provided with opposing pairs of side walls and an end wall, said end wall having an air inlet adapted for the flow of an airstream therethrough, an air volume regulator within said main housing and comprising a regulator housing having an open inlet end and having a pair of opposing, forwardly converging, perforate side walls with other opposing side walls extending between and connected to the perforate side walls, and curtain means in said regulator housing for engaging and varying the effective area of the inner surfaces of said perforate side walls to thereby control the volume of the airstream emerging from said regulator into said main housing, conduit means supporting said air volume regulator so as to dampen the vibrations produced by the flow of air therethrough to reduce the noises created by the air volume regulator being transferred to said main housing, said conduit means comprising a duct having a minimum length in the direction of flow of the airstream therethrough of about 6 inches and having flanged opposite ends, said duct communicating with and extending between said air inlet and the inlet end of said air volume regulator and being positioned out of contact with the side walls of said main housing, and said duct having one flanged end secured to the inlet end of said regulator housing and having its other flanged end secured to and supported by said end wall of said main housing so as to support said air volume regulator out of contact with the side walls of the main housing, said flanged ends of said duct facilitating connecting the ends of the duct to said air volume regulator and said main housing end wall and also serving to interrupt the flow of vibrations from the volume regulator to the main housing.

5. Apparatus according to claim 4, wherein said duct also comprises opposing pairs of side walls, said side walls of both the duct and the regulator housing being of sheet material of substantially the same type, and said side walls of said duct being of a heavier gauge thickness than the walls of said regulator housing.

* * * * *